United States Patent
Grossman

(10) Patent No.: US 7,390,841 B2
(45) Date of Patent: Jun. 24, 2008

(54) COMPOSTABLE VINYL HALIDE POLYMER COMPOSITIONS AND COMPOSITE SHEETS

(75) Inventor: Richard F. Grossman, Wilmington, DE (US)

(73) Assignee: BioTech Products, LLC, Randolph, NJ (US)

( * ) Notice: Subject to any disclaimer, the term of this patent is extended or adjusted under 35 U.S.C. 154(b) by 320 days.

(21) Appl. No.: 11/041,322

(22) Filed: Jan. 24, 2005

(65) Prior Publication Data

US 2006/0167132 A1  Jul. 27, 2006

(51) Int. Cl.
- B32B 3/10 (2006.01)
- B32B 5/00 (2006.01)
- B32B 3/00 (2006.01)
- B32B 7/00 (2006.01)
- B32B 9/04 (2006.01)
- B32B 27/02 (2006.01)
- C07F 7/00 (2006.01)
- C08J 3/00 (2006.01)
- C08K 5/56 (2006.01)
- C08L 27/00 (2006.01)
- C08G 18/28 (2006.01)
- D06P 1/52 (2006.01)

(52) U.S. Cl. ............ 523/124; 428/98; 428/137; 428/147; 428/190; 442/155; 442/164; 523/126; 524/176; 524/178; 524/210; 524/218; 524/225; 524/567; 524/569

(58) Field of Classification Search ......... 523/124, 523/126; 428/98, 137, 147, 190; 442/155, 442/164; 524/176, 178, 210, 218, 225, 567, 524/569
See application file for complete search history.

(56) References Cited

U.S. PATENT DOCUMENTS

| | | | |
|---|---|---|---|
| 2,641,588 A | 6/1953 | Leistner et al. | 260/45.75 |
| 2,641,596 A | 6/1953 | Leistner et al. | 260/98 |
| 2,648,650 A | 8/1953 | Weinberg et al. | 260/30.6 |
| 2,726,227 A | 12/1955 | Leistner et al. | 260/45.75 |
| 2,726,254 A | 12/1955 | Leistner et al. | 260/429 |
| 2,801,258 A | 7/1957 | Johnson | 260/429.7 |
| 2,870,119 A | 1/1959 | Leistner et al. | 260/45.75 |
| 2,870,182 A | 1/1959 | Leistner et al. | 260/429.7 |
| 2,872,468 A | 2/1959 | Leistner et al. | 260/429.7 |
| 2,883,363 A | 4/1959 | Leistner et al. | 260/45.75 |
| 2,891,922 A | 6/1959 | Johnson | 260/31.8 |
| 2,914,506 A | 11/1959 | Mack et al. | 260/45.75 |
| 2,954,363 A | 9/1960 | Kuehne et al. | 260/45.75 |
| 3,021,302 A | 2/1962 | Frey et al. | 260/45.5 |
| 3,413,264 A | 11/1968 | Hechenbleikner et al. | 260/45.75 |
| 3,424,712 A | 1/1969 | Gottlieb et al. | 260/45.75 |
| 3,424,717 A | 1/1969 | Gottlieb et al. | 260/45.75 |
| 4,069,192 A | 1/1978 | Monte et al. | 260/37 EP |
| 4,080,353 A | 3/1978 | Monte et al. | 260/40 R |
| 4,087,402 A | 5/1978 | Monte et al. | 260/42.14 |
| 4,094,853 A | 6/1978 | Monte et al. | 260/40 R |
| 4,096,110 A | 6/1978 | Monte et al. | 260/40 R |
| 4,098,758 A | 7/1978 | Monte et al. | 260/42.14 |
| 4,101,810 A | 7/1978 | Schermerhorn et al. | 315/169 TV |
| 4,122,062 A | 10/1978 | Monte | 260/42.14 |
| 4,152,311 A | 5/1979 | Monte et al. | 260/29.2 EP |
| 4,192,792 A | 3/1980 | Sugerman et al. | 260/42.14 |
| 4,261,913 A | 4/1981 | Monte et al. | 260/429.5 |
| 4,277,415 A | 7/1981 | Sugerman et al. | 260/429.5 |
| 4,338,220 A | 7/1982 | Sugerman et al. | 252/430 |
| 4,417,009 A | 11/1983 | Sugerman et al. | 523/451 |
| 5,514,734 A * | 5/1996 | Maxfield et al. | 523/204 |

FOREIGN PATENT DOCUMENTS

| | | |
|---|---|---|
| GB | A-1 423 657 | 2/1976 |
| GB | A-1 488 620 | 10/1977 |

OTHER PUBLICATIONS

Merslowsky, Ivo, *Fate of PVC Polymer, Plasticizers, and Stabilizers in Landfilled Waste*, Journal of Vinyl & Additive Technology, Mar. 2002, vol. 8, No. 1.

A.V. Yabannavar et al., Methods for Assessment of Biodegradability of Plastic Films in Soil, Applied and Environmental Microbiology, vol. 60, No. 9, Oct. 1994, pp. 3608-3614.

T. M. Phillips et al., Biodegradation of Hexachlorocyclohexane (HCH) by Microorganisms, Biodegradation 16: 363-392 (2005).

Y. Otake et al., Biodegradation of Low-Density Polyethylene, Polystyrene, Polyvinyl Chloride, and Urea Formaldehyde Resin Buried Under Soil for Over 32 Years, J Applied Polymer Science, vol. 56, 1789-1796 (1995).

I. Mersiowsky, Fate of PVC Polymer, Plasticizers, and Stabilizers in Lanfilled Waste, J Vinyl & Additive Technology, vol. 8, No. 1, Mar. 2002.

Leonard I. Nass and Charles A. Heiberger, Encyclopedia of PVC, vol. 2, p. 47, Marcel Dekker, Inc., New York.

* cited by examiner

*Primary Examiner*—Patrick D Niland
(74) *Attorney, Agent, or Firm*—Wood, Herron & Evans, L.L.P.

(57) ABSTRACT

Compositions of vinyl halide polymers such as PVC are rendered compostable by a prodegradant system of an organotitanate or zirconate and an organotin. PVC sheets and composites are compostable in landfills.

30 Claims, No Drawings

COMPOSTABLE VINYL HALIDE POLYMER COMPOSITIONS AND COMPOSITE SHEETS

FIELD OF THE INVENTION

This invention relates to compostable or biodegradable vinyl halide polymer compositions, for example, polyvinyl chloride (PVC) and composite sheets of such polymers

BACKGROUND OF THE INVENTION

For many years it has been desired to make plastic materials from vinyl halide polymers such as polyvinyl chloride (PVC) which are either biodegradable by microorganisms or environmentally degradable such as in a landfill. In spite of considerable efforts, landfills are becoming inundated with plastic materials, and articles made therefrom, that will not degrade perhaps for centuries. This is especially true for vinyl halide polymer materials such as PVC that are considered non-biodegradable, that is, they persist in landfills under anaerobic conditions indefinitely without noticeable decomposition. This factor limits the acceptance of PVC in many products where its useful balance of properties and low cost would be attractive. An example is that of printable film and sheet. If a sample of flexible (plasticized) PVC is tested per ASTM D 5526, Standard Test Method for Determining Anaerobic Biodegradation of Plastic Materials Under Accelerated Landfill Conditions, there is no appreciable weight loss or change in appearance after 100 days at 97° F. in contact with simulated household waste. In contrast, cellulosic polymers and other biodegradable plastics, such as polylactic acid and polycaprolactone, are completely consumed.

There has been a particular need for a compostable vinyl halide polymer composition for use in many end products such as polyvinyl chloride films, banners, billboards, signs, laminates, ink jet media, diapers, hygienic pads and the like. These products must satisfy properties for practical purposes such as tear strength, tensile and impact strengths to function in many useful articles. However, the same properties that make them useful lead to their lack of biodegradability. PVC and other vinyl halide polymers have achieved widespread usage in many practical articles. However, the goal of a compostable vinyl halide polymer composition or composite has not been satisfied.

SUMMARY OF THE INVENTION

This invention is directed to a compostable vinyl halide polymer composition. In particular, polyvinyl chloride (PVC) compositions have been rendered compostable by formulation with a prodegradant composition of an organotitanate or zirconate compound and an organotin compound.

In a broader form of the invention, polyvinyl chloride compositions have been formulated with plasticizer and stabilizer along with the prodegradant composition. Polymeric sheets containing this composition and composites with woven or nonwoven sheets have been made compostable.

It has now been found that PVC can be formulated to yield biodegradability comparable or superior to cellulosic polymers. In a more specific form of the invention, such compositions consist of (a) PVC; (b) a plasticizer selected from the group of completely aliphatic carboxylic acid esters; (c) a heat stabilizer selected from the group of sulfur-free dialkyl and monoalkyltin carboxylates; and (d) a reactive organotitanate or organozirconate. Such compositions can be used to produce PVC film and sheet by standard methods, such as extrusion, calendering or coating from plastisols or organosols. They may contain other additives routinely used in PVC compounding, such as fillers, pigments, antioxidants, UV light absorbers, bonding agents, etc. Such films may be laminated to biodegradable fabrics made from polymers such as polyvinyl alcohol, polyacryamide, polyacrylate, polymethacrylate and polyester, or to paper to produce laminates that are totally biodegradable under landfill conditions. These laminates are particularly useful for printable sheeting constructions that, after usage, may be disposed of in standard landfills.

The compositions and composites of this invention are compostable. "Compostable" means that the composition or sheet undergoes chemical, physical, thermal and/or biological degradation such that it may be incorporated into and is physically indistinguishable from finished compost (humus) and which ultimately mineralizes (biodegrades) to $CO_2$, water and biomass in the environment like other known compostable matter such as paper and yard waste. The compostable films and composites are either biodegradable or environmentally degradable. "Biodegradable" means that the composition or composite is susceptible to being assimilated by microorganisms when buried in the ground or otherwise contacted with the organisms under conditions conducive to their growth. "Environmentally degradable" means that the film or layer is capable of being degraded by heat or surrounding environmental elements without microorganisms to a form that ultimately may be biodegradable when it mineralizes, for example, biodegrades to carbon dioxide, water and biomass. For purposes of this invention, "compostable" is intended to include "biodegradable" or "environmentally degradable".

Composting conditions that enable the chemical, physical, thermal and/or biological degradation of the composition or composite may vary. The compositions or composites of this invention are especially adapted to be compostable in municipal solid waste composting facilities or landfills. For example, following ASTM D 5526-94 (reapproved 2002), Standard Test Method for Determining Anaerobic Biodegradation of Plastic Materials Under Accelerated Landfill Conditions, samples of PVC were degraded, incorporated into and physically indistinguishable in the test landfill.

Compostable vinyl halide polymer compositions and composites of this invention, their method of manufacture and compostability will be understood with reference to the following detailed description.

DETAILED DESCRIPTION OF THE INVENTION

A. Vinyl Halide Polymer

The vinyl halide resin employed is most commonly a homopolymer of vinyl chloride, i.e., polyvinyl chloride. It is to be understood, however, that this invention is not limited to a particular vinyl halide resin such as polyvinyl chloride or its copolymers. Other halogen-containing polymers or resins which are employed and which illustrate the principles of this invention include chlorinated polyethylene, chlorosulfonated polyethylene, chlorinated polyvinyl chloride, and other vinyl halide polymer or resin types. Vinyl halide polymer or resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C$—$CHCl$ to polyvinyl chloride ($CH_2CHCl$—)n wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinate polyethylene, and the like. Of course, the vinyl halide commonly used in the industry is the chloride, although others such as bromide and fluoride may be used. Examples of the latter polymers include polyvinyl bromide, polyvinyl fluoride, and copolymers thereof.

B. Prodegradant System

The prodegradant system or composition of this invention comprises an organozirconate or organotitanate amide adduct and an organotin compound.

(1) Organotitanate or Organozirconate Amide Adducts

The chemical description and chemical structure of organotitanates or zirconates has been well developed. For instance, Kenrich LICA 38J is a reactive titanate under the chemical name titanium IV neoalkanolato, tri(dioctyl) pyrophosphato-O (adduct) N-substituted methacrylamide. Furthermore, with zirconium substituted for titanium, Kenrich produces NZ 38 under the chemical description zirconium IV neoalkanolato, tri(dioctyl) pyrophosphato-O (adduct) N-substituted methacrylamide. These compounds are generally referred to as amide salts of neoalkoxy modified monoalkoxy titanate or zirconate. While the invention has been exemplified with these amide adducts of these specific organotitanates or organozirconates, it is to be understood that other similar compounds can achieve the objectives of this invention.

These organotitanates or zirconates are further described in considerable detail in the following US Patents which are incorporated herein in their entireties by reference, namely, U.S. Pat. Nos. 4,069,192; 4,080,353; 4,087,402; 4,094,853; 4,096,110; 4,098,758; 4,122,062; 4,152,311; 4,192,792; 4,101,810; 4,261,913; 4,277,415; 4,338,220; 4,417,009.

(2) Organotin Compounds

Mono- and diorganotin compounds are well known stabilizers for PVC. The generalized organotin stabilizer formula is $R_2SnX_2$ or $R_2SnX_3$. The R-group used in the above general formula of tin stabilizers can be lower alkyl such as butyl. More recently, because of availability and relatively low cost, fatty acid carboxylates have been employed. Cost-effective methods have been developed to produce tin intermediates which were then reacted with carboxylic acids or with ligands containing mercaptan groups to yield stabilizers for vinyl halide resins. Accordingly, among the class of organotin compounds suitable for use in accordance with this invention are organotin carboxylates or organotin sulfur-containing compounds are U.S. Pat. Nos. 2,641,588; 2,648,650, 2,726,227; 2,726,254; 2,801,258; 2,870,119; 2,891,922; 2,914,506 and 2,954,363; the organotin mercaptoacid esters as described in U.S. Pat. No. 2,641,596; organotin esters of mercapto alcohols of U.S. Pat. Nos. 2,870,119; 2,870,182; 2,872,468 and 2,883,363; and organo thiostannoic acids such as butyl thiostannoic acid as disclosed in U.S. Pat. Nos. 3,021,302; 3,413, 264; 3,424,712 and 3,424,717. All of these patents are incorporated herein in their entireties by reference. Organotin carboxylates, such as dibutyltin dilaurate or dibutyltin maleate, are preferred. Other organotins can be used.

(3) Prodegradant Synergistic Composition

It has been discovered that the prodegradant composition of organotitanate or organozirconate compound and organotin displays an unpredicted synergism in the compostability of vinyl halide polymers. The remarkable compostability property exists over ranges of ratios of the essential components. The exact mechanism for the unexpected results and the compostability of vinyl halide polymers with the prodegradant system is not completely understood. Certainly there are theories which could be proposed, but regardless of theories, the beneficial results evident in the numerous examples of this invention which follow, in further view of this detailed description, speak for themselves. Applicant relies upon these empirical demonstrations of the principles of this invention to advance its merit.

In the prodegradant system of this invention, it has been found that the total composition of prodegradant is useful over a range of about 1 to about 10 parts (phr) by weight based upon 100 parts by weight of the vinyl halide polymer. The most useful range of total parts by weight of the organotin or zirconate in the total composition is on the order of about 5 to about 7 phr. In the case of organotin compound, the most useful parts are on the order of about 2 to about 3 phr. Each of the components of the system can range from 1 to 10 phr. The ratios of the components is not considered to be critically limiting among the broader aspects of the invention.

(4.) Plasticizer

In a broader mode, the vinyl halide composition is plasticized with aliphatic or aromatic esters, typically, di-octyl adipate (DOA), di-isononylester of cyclohexane dicarboxylic acid or di-isodecyl phthalate (DIDP). In its presently best mode, the aliphatic ester is used. It is presently believed that the mobility in the polymeric matrix lent by the plasticizer is important because rigid PVC samples have not demonstrated compostability.

The principles of this invention and its operating parameters will be further understood with reference to the following detailed examples which serve to illustrate the types of specific prodegradants and their amounts as used in typical vinyl halide polymer resin formulations and the compostabilities displayed by the essential combination of the prodegradant system components of this invention. These examples are considered to be exemplary of this invention and should not be considered as limiting, especially in view of applicant's broad disclosure of the principles of this invention.

In each of the examples, standard resin formula was employed which contained 100 parts by weight polyvinyl chloride homopolymer (Geon 121 PVC by B.F. Goodrich). Included in the standard formula was a plasticizer such as di-octyl adipate (DOA) or di-isodecyl phthalate (DIDP).

The compostability of the PVC compositions of the examples was determined by following ASTM D 5526-94 (reapproved 2002), Standard Test Method for Determining Anaerobic Biodegradation of Plastic Materials Under Accelerated Landfill Conditions. Using the standard test, a mixture was prepared comprising 60% by weight of sterilized dehydrated manure (to simulate processed household waste), 30% distilled water, and 10% fermenting inoculum from an active composter. 50 g were used in sealed Petri dishes with ½ by 1 inch samples of PVC composition or composite sheet material. All experiments were run at 97° F. in a dark incubator.

EXAMPLE 1

A plastisol was mixed consisting of 100 parts PVC (Geon 121), 80 parts di-isodecyl phthalate (DIDP), and 2 parts dibutyltin dilaurate (DBTDL) heat stabilizer; coated as a 2 mil film on release paper and fused. Samples were unchanged after 90 days exposure to the test conditions of ASTM D 5526-94. The procedure was repeated using di-octyl adipate (DOA) in place of DI DP. After 90 days, there was visible mold growth on the film but no visible evidence of decomposition. The procedure was repeated with the addition of 2.5 parts of a 4% solution of isothiazolone biocide (MICRO- CHEK 11, Ferro Corporation). In this case, there was no evidence of mold growth after 90 days.

EXAMPLE 2

The plastisol of Example 1 was mixed using DOA, DBTDL plus 5 parts of titanium neoalkanato, tri(dioctyl) pyrophosphato-O-(adduct)-N-substituted methacrylamide (Kenrich LICA 38J). Fused samples were consumed in the test landfill within 10 days, vanishing to the visible eye. The experiment was repeated adding 2.5 parts of MICRO-CHEK 11 biocide, with identical results.

EXAMPLE 3

The plastisol of Example 1 was mixed with DBTDL, LICA 38J and, replacing DOA, the di-isononyl ester of cyclohexane dicarboxylic acid (DINCH, BASF). Upon testing per ASTM D 5526-94 method, fused samples disappeared in 7 days, with or without added biocide.

EXAMPLE 4

Example 3 was repeated with the zirconate analog of LICA 38J (Kenrich NZ 38J). Upon testing per ASTM D 5526-94 method, fused samples disappeared within 10 days.

EXAMPLE 5

The plastisol was mixed using DINCH, LICA 38J and dibutyltin maleate ester heat stabilizer (PLASTISTAB 2808, Halstab) in place of DBTDL. Upon testing per ASTM D 5526-94 method, fused samples disappeared within 10 days.

EXAMPLE 6

The plastisol was mixed using DINCH, LICA 38J, and 2 parts of a liquid calcium/zinc stabilizer (PLASTISTAB 3002, Halstab) in place of DBTDL organotin. After 90 days, the fused sample had heavy mold growth and had fragmented but was still visibly of the same dimensions.

EXAMPLE 7

Control samples were run for comparison. Upon testing per ASTM D 5526-94 method, samples of untreated filter paper showed mold growth within week and were consumed in 30 days. A sample of polylactic acid (PLA) 2 mil film was completely consumed in seven days. A sample of 1 mil low density polyethylene (LDPE) film was unchanged after 90 days.

EXAMPLE 8

A plastisol was mixed consisting of 100 parts Geon 121 PVC, 80 parts DOA, 2 parts DBTDL stabilizer and 5 parts of LICA 38, which is the titanate LICA 38J without the methacrylamide adduct. After 30 days at 97° F. per ASTM D 5526, there was no visible sign of decomposition. The same result was found with NZ 38, the zirconate bases for NZ 38J, and with 5 parts of methacrylamide itself. These tests establish that the methacrylamide adduct of the organotitanate or zirconate is necessary for compostability.

EXAMPLE 9

A plastisol was mixed consisting of 100 parts PVC, 80 parts DOA, 5 parts LICA 38J organotitanate-methacrylamide adduct, and 2 parts of dibutyltin di-isothioglycolate (SP1002, Ferro Corporation). After 30 days, there was only minor decomposition. This probably reflects the antioxidant capability of organotin mercaptides. It also presently establishes the preferred organotin carboxylates in the prodegradant system.

EXAMPLE 10

Example 9 was repeated using the following stabilization system: epoxidized soybean oil (ESO)—2 parts; phenyl di-iso-decyl phosphite—2 parts; zinc stearate—0.2 parts. After 30 days, there was no visible compostability, probably due to the antioxidant capability of the phosphite that would be used in most mixed metal stabilizer systems. In this case there was, however, notable mold growth, so it is possible that there might be eventual decomposition (period of years). Repetition using ESO containing 4% isothiazolone biocide led to no mold growth.

EXAMPLE 11

As described previously, plastisol was mixed consisting of 100 parts Geon 121 PVC, 80 parts DOA, 2 parts DBTDL, and 5 parts of Kenrich LICA 38J reactive titanate. To this was added 5 parts of VULCABOND MDX (Akzo Nobel) bonding agent. The plastisol was coated on polyester fabric and fused to a coating of about 5 mils thickness.

A sample of this coated fabric with the inventive prodegradant system and a control sample of a commercial finished product of the same construction (without the prodegradant system) were exposed at 90° F. per ASTM D5526 conditions. After two weeks exposure, the control sample was essentially unchanged. The inventive sample has lost almost all trace of plastisol to the landfill, the only remnants being that which penetrated intersections of the fabric mesh. The fabric shows evidence of some decomposition and it is anticipated that the polyester will slowly decompose.

Having described this invention in its various embodiments and parameters, other variations will become apparent to a person of ordinary skill in the art.

What is claimed is:

1. A compostable vinyl halide polymer composition comprising
   a vinyl halide polymer,
   a plasticizer,
   a prodegradant system comprising an amide adduct of an organotitanate and an organotin compound, said prodegradant system in relative amounts to render the vinyl halide polymer composition compostable wherein the organotitanate is titanium IV neoalkanolato, tri(dioctyl) pyrophosphato-O (adduct) N-substituted methacrylamide.

2. The composition of claim 1 wherein the components of the prodegradant system are contained in total amounts from about 1 to about 10 phr of polymer.

3. The composition of claim 1 wherein each of the components of the prodegradant system is contained in an amount of from about 1 to about 10 phr of polymer.

4. The composition of claim 3 wherein the organotitanate is in an amount of from about 5 to about 7 phr and organotin is in an amount of about 2 to about 3 phr.

5. The composition of claim 1 wherein the organotin is an organotin carboxylate.

6. A compostable vinyl halide polymer composition comprising
   a vinyl halide polymer,
   a plasticizer,
   a prodegradant system comprising an amide adduct of an organozirconate and an organotin compound, said prodegradant system in relative amounts to render the vinyl halide polymer composition compostable wherein the organozirconate is zirconium IV neoalkanolato, tri(dioctyl) pyrophosphato-O (adduct) N-substituted methacrylamide.

7. The composition of claim 6 wherein each of the components of the prodegradant system is contained in an amount from about 1 to about 10 phr of polymer.

8. The composition of claim 6 wherein the organozirconate is in an amount from about 5 to about 7 phr and the organotin is in an amount of about 2 to about 3 phr.

9. The composition of claim 6 wherein the organotin is an organotin carboxylate.

10. The composition of claim 1 or 6 wherein the vinyl halide polymer is polyvinyl chloride or copolymers thereof and the plasticizer is an ester.

11. A compostable polyvinyl chloride (PVC) polymer composition comprising
   polyvinyl chloride or copolymers thereof,
   a plasticizer,
   a prodegradant system comprising an amide adduct selected from the group consisting of titanium IV neoalkanolato, tri(dioctyl) pyrophosphato-O (adduct) N-substituted methacrylamide and zirconium IV neoalkanolato, tri(dioctyl) pyrophosphato-O (adduct) N-substituted methacrylamide and an organotin carboxylate, said prodegradant system in relative amounts to render the PVC polymer composition compostable.

12. The composition of claim 11 wherein the plasticizer is an aliphatic ester.

13. The composition of claim 11 wherein the organotin carboxylate is selected from the group consisting of dibutyltin dilaurate and dibutyltin maleate.

14. The composition of claim 11 wherein each of the components of the prodegradant system is contained in an amount of from about 1 to about 10 phr of polymer.

15. The composition of claim 11 wherein the organotitanate or zirconate is in an amount of from about 5 to about 7 phr and organotin is in an amount of about 2 to about 3 phr.

16. A compostable vinyl halide polymer sheet comprising
   a film of vinyl halide polymer
   a plasticizer, and
   a prodegradant system comprising an amide adduct of an organotitanate and an organotin compound, said prodegradant system in relative amounts to render the vinyl halide polymer sheet compostable wherein the organotitanate is titanium IV neoalkanolato, tri(dioctyl) pyrophosphato-O (adduct) N-substituted methacrylamide.

17. The compostable sheet of claim 16 where the organotitanate is in an amount of from about 5 to about 7 phr and organotin is in an amount of about 2 to about 3 phr.

18. A compostable vinyl halide polymer sheet comprising
   a film of vinyl halide polymer
   a plasticizer, and
   a prodegradant system comprising an amide adduct of an organozirconate and an organotin compound, said prodegradant system in relative amounts to render the vinyl halide polymer sheet compostable wherein the organozirconate is zirconium IV neoalkanolato, tri(dioctyl) pyrophosphato-O (adduct) N-substituted methacrylamide.

19. The compostable sheet of claim 18 wherein the organozirconate is in an amount of from about 5 to about 7 phr and the organotin is in an amount of about 2 to about 3 phr.

20. The compostable sheet of claim 16 or 18 wherein the vinyl halide polymer is polyvinyl chloride or copolymers thereof and the plasticizer is an aliphatic ester.

21. A composite comprising a sheet of claim 16 or 18 and a woven or nonwoven fabric.

22. The composite of claim 21 wherein said woven or nonwoven fabric is compostable.

23. The composite of claim 22 wherein said compostable fabric is a polymer selected from the group consisting of polyvinyl alcohol, polyacrylamide, polyacrylate, polymethacrylate and polyester.

24. A compostable polyvinyl chloride (PVC) sheet comprising
   polyvinyl chloride or copolymers thereof,
   a plasticizer,
   a prodegradant system comprising an amide adduct selected from the group consisting of titanium IV neoalkanolato, tri(dioctyl) pyrophosphato-O (adduct) N-substituted methacrylamide and zirconium IV neoalkanolato, tri(dioctyl) pyrophosphato-O (adduct) N-substituted methacrylamide and an organotin carboxylate, said prodegradant system in relative amounts to render the vinyl halide polymer composition compostable.

25. The sheet of claim 24 wherein the plasticizer is an ester.

26. The sheet of claim 24 wherein the ester is an aliphatic ester.

27. The sheet of claim 24 wherein the organotin carboxylate is selected from the group consisting of dibutyltin dilaurate and dibutyltin maleate.

28. A composite comprising the sheet of claim 24 and a woven or nonwoven fabric.

29. The composite of claim 28 wherein said nonwoven or nonwoven fabric is compostable.

30. The composite of claim 29 wherein said compostable fabric is a polymer selected from the group consisting of polyvinyl alcohol, polyacrylamide, polyacrylate, polymethacrylate and polyester.

* * * * *